(12) United States Patent
Han et al.

(10) Patent No.: US 10,949,782 B2
(45) Date of Patent: Mar. 16, 2021

(54) TELECOMMUNICATION NETWORK TECHNICIAN SCHEDULING VIA MULTI-AGENT RANDOMIZED GREEDY SEARCH

(71) Applicant: AT&T Intellectual Property I, L.P., Atlanta, GA (US)

(72) Inventors: Sang Han, Dallas, TX (US); Rudolph Mappus, Plano, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 140 days.

(21) Appl. No.: 16/211,947

(22) Filed: Dec. 6, 2018

(65) Prior Publication Data
US 2020/0184406 A1  Jun. 11, 2020

(51) Int. Cl.
*G06Q 10/06* (2012.01)

(52) U.S. Cl.
CPC ......... *G06Q 10/063116* (2013.01); *G06Q 10/06395* (2013.01)

(58) Field of Classification Search
CPC .................................. G06Q 10/00–50/00
USPC ................................. 705/7.11–7.42
See application file for complete search history.

(56) References Cited

U.S. PATENT DOCUMENTS

| 5,343,388 A | 8/1994 | Wedelin |
| 5,615,121 A | 3/1997 | Babayev et al. |
| 5,911,134 A | 6/1999 | Castonguay et al. |
| 5,913,201 A | 6/1999 | Kocur |
| 5,943,652 A * | 8/1999 | Sisley ............... G06Q 10/06 705/7.25 |
| 6,272,483 B1 | 8/2001 | Joslin et al. |
| 6,317,732 B1 | 11/2001 | Inoue et al. |
| 6,345,239 B1 * | 2/2002 | Bowman-Amuah ............ G06Q 20/10 703/6 |
| 6,456,996 B1 | 9/2002 | Crawford et al. |

(Continued)

FOREIGN PATENT DOCUMENTS

JP  6251663 B2  12/2017

OTHER PUBLICATIONS

Nozick, L. K. "The fixed charge facility location problem with coverage restrictions." Transportation Research Part E: Logistics and Transportation Review 37.4 (2001): 281-296. (Year: 2001).*

(Continued)

*Primary Examiner* — Alan S Miller

(57) ABSTRACT

A processing system may obtain a loan graph including a travel cost for network technicians between adjacent work centers of a telecommunication network, each network technician assigned to a work center, and obtain work quantities for each work center for a day, at least a first work center having excess work for network technicians assigned to the first work center. The processing system may select, in accordance with an objective function, moves by a first subset of network technicians comprising moves to adjacent work centers from the work centers to which the first subset is assigned, select in accordance with the objective function, moves by a second subset of network technicians comprising moves to adjacent work centers from work centers to which the second subset is assigned, and generate a work plan for the day for the network technicians in accordance with the moves.

20 Claims, 6 Drawing Sheets

(56) References Cited

U.S. PATENT DOCUMENTS

| | | | |
|---|---|---|---|
| 6,823,315 | B1 | 11/2004 | Bucci et al. |
| 6,826,549 | B1 | 11/2004 | Marks et al. |
| 7,246,075 | B1 | 7/2007 | Testa |
| 7,343,312 | B2 | 3/2008 | Capek et al. |
| 7,480,913 | B2 | 1/2009 | Buco et al. |
| 7,725,339 | B1 | 5/2010 | Aykin |
| 7,788,199 | B2 | 8/2010 | Moses et al. |
| 7,885,848 | B2 * | 2/2011 | Kagan .............. G06Q 10/06315 |
| 8,612,272 | B1 | 12/2013 | Aykin |
| 8,781,873 | B2 | 7/2014 | Purohit et al. |
| 8,818,832 | B2 | 8/2014 | Goyal et al. |
| 9,355,388 | B2 | 5/2016 | Balachandran et al. |
| 2003/0139961 | A1 * | 7/2003 | Arguello ................ G06Q 10/04 705/7.14 |
| 2003/0177052 | A1 * | 9/2003 | Smith, III .............. G06Q 99/00 705/7.14 |
| 2005/0033731 | A1 | 2/2005 | Lesh et al. |
| 2006/0047551 | A1 * | 3/2006 | Cotten .................. G06Q 30/02 705/7.14 |
| 2010/0030594 | A1 | 2/2010 | Swart |
| 2013/0054289 | A1 | 2/2013 | Sengupta et al. |
| 2013/0290063 | A1 | 10/2013 | Gonzalez et al. |
| 2014/0122143 | A1 | 5/2014 | Fletcher et al. |
| 2014/0149167 | A1 | 5/2014 | Lo et al. |
| 2014/0207508 | A1 * | 7/2014 | Faulkner ........ G06Q 10/063116 705/7.16 |
| 2015/0356483 | A1 * | 12/2015 | Saliba ................. G06F 16/2237 705/7.24 |
| 2017/0213181 | A1 | 7/2017 | Katz et al. |
| 2018/0165618 | A1 | 6/2018 | Menache et al. |

OTHER PUBLICATIONS

Caprara, Alberto, Michele Monad, and Paolo Toth. "Models and algorithms for a staff scheduling problem." Mathematical programming 98.1-3 (2003): 445-476. https://www.researchgate.net/publication/220588883_Models_and_algorithms_for_a_staff_scheduling_problem.

Choy, Murphy, and Michelle Cheong. "A greedy double swap heuristic for nurse scheduling." arXiv preprint arXiv:1205.2200 (2012). https://arxiv.org/pdf/1205.2200.pdf.

Castillo-Salazar, J. Arturo, Dario Landa-Silva, and Rong Qu. "A greedy heuristic for workforce scheduling and routing with time-dependent activities constraints." (2015): 367-375. https://www.researchgate.net/publication/292002639_A_Greedy_Heuristic_for_Workforce_Scheduling_and_Routing_With_Time-dependent_Activities_Constraints.

Hast, Jari. "Optimal work shift scheduling: a heuristic approach." (2017). http://sal.aalto.fi/publications/pdf-files/thas17_public.pdf.

Hashimoto, Hideki, et al. "A GRASP-based approach for technicians and interventions scheduling for telecommunications." Annals of Operations Research 183.1 (2011): 143-161. https://hal.archives-ouvertes.fr/hal-00814781/document.

Binato, S., et al. "A greedy randomized adaptive search procedure for job shop scheduling." Essays and Surveys in Metaheuristics, ATT Labs Research Technical Report (2000). https://www.researchgate.net/profile/Mauricio_Resende2/publication/228792021_A_greedy_randomized_adaptive_search_procedure_for_job_shop_scheduling/links/0912f50ed9fab9f363000000.pdf.

Kovacs, Attila Andras. Heuristics for service technician routing and scheduling Problems. Diss. uniwien, 2009. http://othes.univie.ac.at/7906/1/2009-12-18_0300375.pdf.

Boussier, Sylvain, et al. "Some improvements for Technician and Interventions Scheduling for Telecommunications." http://uahost.uantwerpen.be/eume/workshops/eume08/papers/paper31.pdf.

* cited by examiner

Randomized Greedy Search in Technician Scheduling

1:  Input:   vector of hours of work $X = [x_1, x_2, \ldots, x_K]$, where $K$ is number of regions
2:            vector of numbers of technicians $N = [n_1, n_2, \ldots, n_K]$
3:            loan graph $G$
4:            objective function $f(X, N)$
5:            probability $p$
6:            probability decrease rate $d$
7:  Output:  vector of new hours of work $X' = [x_1', x_2', \ldots, x_K']$
8:            vector of new numbers of technicians $N' = [n_1', n_2', \ldots, n_K']$
9:
10: $T = f(X, N)$
11: Improvement $= T$
12: While Improvement does not converge:
13:   $R$ = random sequence of technicians of size $0.1|M|$
14:   For $r$ in $R$:
15:     if original state $\neq$ current state:
16:        then put $r$ back to original state
17:     $A$ = list of states reachable from original state
18:     $S$ = empty set
19:     For $a$ in $A$:
20:        move $r$ to $a$ and compute $X'$ and $N'$
21:        add $f(X', N')$ to $S$
22:        put $r$ back to original state
23:     $X', N'$ = argmin $S$
24:     if rand(0,1) $< p$:
25:        then $X', N' = X, N$
26:        delete an edge in reverse direction from $G$
27:     $X, N = X', N'$
28:   Improvement $= T - f(X', N')$
29:   $T = f(X', N')$
30:   $p = p * d$
31: return $X', N'$

FIG. 3

TELECOMMUNICATION NETWORK TECHNICIAN SCHEDULING VIA MULTI-AGENT RANDOMIZED GREEDY SEARCH

The present disclosure relates generally to telecommunication network maintenance, and more particularly to methods, computer-readable media, and devices for generating a work plan for network technicians of a telecommunication network to include network technician moves among work centers selected in accordance with an objective function.

BACKGROUND

Due to inconsistent demands, on any given day a telecommunication network may have different work demands for network technicians in one region as compared to another region. Thus, in some instances, one or more technicians may be loaned from a first region to a second region to better match the different work demands. For instance, a regional office may have an option to loan or borrow network technicians to/from nearby regional offices. In one example, by union contract, a network technician may be required to report to a default location (e.g., the network technician's assigned regional office) first and then travel to whichever region the technician is needed.

SUMMARY

In one example, the present disclosure provides a method, computer-readable medium, and device for generating a work plan for network technicians of a telecommunication network to include network technician moves among work centers selected in accordance with an objective function. For example, a method may include a processing system having at least one processor obtaining a loan graph among work centers of a telecommunication network, where the loan graph includes a cost of travel of network technicians between work centers that are adjacent, and where each of the network technicians is assigned to one of the work centers. The processing system may obtain a quantity of work in demand for each of the work centers for a day, where at least a first work center has an excess of work in demand for the network technicians assigned to the first work center for the day. The processing system may further select, in accordance with an objective function, a first plurality of moves by at least a first subset of the network technicians, where the first plurality of moves comprises moves to adjacent work centers from work centers to which the first subset of network technicians is assigned, and select, in accordance with the objective function, a second plurality of moves by at least a second subset of the network technicians, where the second plurality of moves comprises moves to adjacent work centers from work centers to which the second subset of network technicians is assigned. The processing system may then generate a work plan for the day for the network technicians in accordance with the first plurality of moves and the second plurality of moves.

BRIEF DESCRIPTION OF THE DRAWINGS

The present disclosure can be readily understood by considering the following detailed description in conjunction with the accompanying drawings, in which:

FIG. 3 illustrates an example algorithm for minimizing an objective function via a randomized greedy search, in accordance with the present disclosure;

To facilitate understanding, identical reference numerals have been used, where possible, to designate identical elements that are common to the figures.

DETAILED DESCRIPTION

The present disclosure broadly discloses methods, non-transitory (i.e., tangible or physical) computer-readable media, and devices for generating a work plan for network technicians of a telecommunication network to include network technician moves among work centers selected in accordance with an objective function. In particular, examples of the present disclosure address the daily scheduling of network technician work as a combinatorial optimization problem with a cost function. For instance, the present disclosure establishes and solves a multi-agent decision-making problem where numerous "agents" (e.g., representing hundreds of network technicians) cooperate to achieve a common goal of minimizing an objective function, e.g., balancing hours of work per network technician or minimizing total overtime. In the present disclosure, the objective function is optimized via a randomized greedy search approach where each agent selected at random takes a greedy action that incrementally contributes to overall goal of the problem. In addition, the present disclosure provides an efficient, linear-time solution to the scheduling problem.

Figure 1:
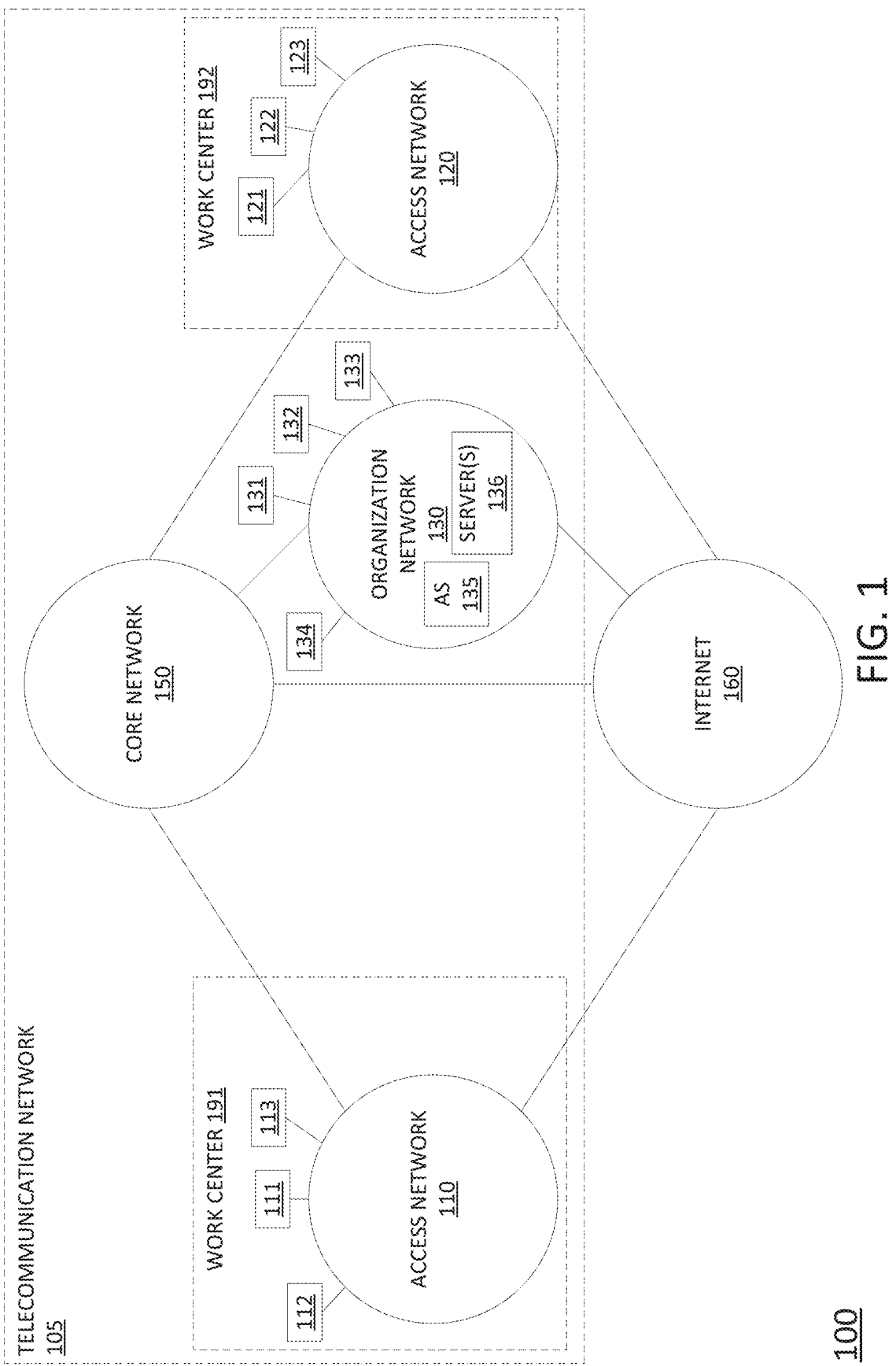
FIG. 1 illustrates one example of a system including a telecommunication network, according to the present disclosure.

To aid in understanding the present disclosure, FIG. 1 illustrates an example system 100 comprising a plurality of different networks for supporting examples of the present disclosure for generating of a work plan for network technicians of a telecommunication network to include network technician moves among work centers selected in accordance with an objective function. Telecommunication network 105 may comprise a core network 150 with components for telephone services, Internet services, and/or television services (e.g., triple-play services, etc.) that are provided to customers (broadly "subscribers"), and to peer networks. In one example, core network 150 may combine core network components of a cellular network with components of a triple-play service network. For example, core network 150 may functionally comprise a fixed mobile convergence (FMC) network, e.g., an IP Multimedia Subsystem (IMS) network. In addition, core network 150 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Core network 150 may also further comprise a broadcast television network, e.g., a traditional cable provider network or an Internet Protocol Television (IPTV) network, as well as an Internet Service Provider (ISP) network. With respect to television service provider functions, core network 150 may include one or more television servers for the delivery of television content, e.g., a broadcast server, a cable head-end, a video-on-demand (VoD) server, and so forth. For example, core network 150 may comprise a video super hub office, a video hub office and/or a service office/central office. For ease of illustration, various components of core network 150 are omitted from FIG. 1.

In one example, access networks 110 and 120 may each comprise a Digital Subscriber Line (DSL) network, a broadband cable access network, or the like. For example, access networks 110 and 120 may transmit and receive communications between endpoint devices 111-113, 121-123, and core network 150 relating to voice telephone calls, communications with web servers via the Internet 160, organization network 130, and so forth. Access networks 110 and 120 may also transmit and receive communications between endpoint devices 111-113, 121-123 and other networks and devices via Internet 160. Endpoint devices 111-113 and 121-123 may each comprise a telephone, e.g., for analog or digital telephony, a mobile device, a cellular smart phone, a laptop, a tablet computer, a desktop computer, a plurality or cluster of such devices, and the like. In some examples, endpoint devices 111-113 and 121-123 may connect to access networks 110 and 120 via one or more intermediate devices, such as a gateway and router, an Internet Protocol private branch exchange (IPPBX), and so forth. In one example, the access networks 110 and 120 may be different types of access networks. In another example, the access networks 110 and 120 may be the same type of access network. In one example, one or more of the access networks 110 and 120 may be operated by the same service provider operating core network 150.

In one example, access networks 110 and 120 may include a plurality of distribution areas (DAs). The distribution areas may include portions of access networks 110 and 120 associated with individual nodes (e.g., fiber optic nodes and/or digital subscriber line access multiplexers (DSLAMs)) and may serve multiple living units (LUs). The living units may include single family homes and businesses, as well as multi-dwelling units (MDUs). The distribution areas may be further associated with different wire centers and/or central offices (COs) (CLLI8) of the telecommunication network 105 and/or access networks 110 and 120. Each distribution area may be a portion of the telecommunication network 105 with fiber to the node (FTTN) or fiber to the curb (FTTC) already deployed (e.g., a hybrid fiber-coaxial (HFC) access network portion), or may comprise regions of the telecommunication network 105 with electrically wired trunks/routes from central offices to nodes (e.g., a DSL access network portion, etc.). In addition, distribution areas may be associated with either overhead utility wiring (aerial) or buried utility wiring (buried).

In one example, an organization network 130 may comprise a local area network (LAN), or a distributed network connected through permanent virtual circuits (PVCs), virtual private networks (VPNs), and the like for providing data and voice communications. In one example, the organization network 130 links one or more endpoint devices 131-134 with each other and with Internet 160, core network 150, devices accessible via such other networks, such as endpoint devices 111-113 and 121-123, and so forth. In one example, endpoint devices 131-134 may each comprise a telephone for analog or digital telephony, a mobile device, a cellular smart phone, a laptop, a tablet computer, a desktop computer, a bank or cluster of such devices, and the like. In one example, the organization network 130 may be associated with the telecommunication network 105. For example, the organization may comprise the telecommunication network service provider, where endpoint devices 131-134 of the organization network 130 may comprise devices of organizational agents, such as customer service agents, marketing personnel, or other employees or representatives who are tasked with addressing customer-facing issues and/or personnel for network maintenance, network repair, construction planning, field technician dispatch, and so forth.

In one example, the system 100 may also include one or more servers 136 in the organization network 130. In one example, the servers 136 may each comprise a computing system, such as computing system 600 depicted in FIG. 6, and may be configured to host one or more centralized system components. It should be noted that in one example, a centralized system component may be hosted on a single server, while in another example, a centralized system component may be hosted on multiple servers, e.g., in a distributed manner. For example, a first centralized system component may comprise a database of customer/subscriber-assigned telephone numbers, while a second centralized system component may comprise a database of customer account data for all or a portion of the customers/subscribers of the telecommunication network 105. Other centralized system components may include a billing system, a customer relationship management (CRM) system, a trouble ticket system, an inventory system (IS), an ordering system, an enterprise reporting system (ERS), an account object (AO) database system, and so forth. In one example, any one or more of the centralized system components may comprise a set of file stores such as a Hadoop® Distributed File System (HDFS™) and/or another cloud/distributed network-based file storage system.

In one example, servers 136 may include a geodatabase and query system, e.g., PostGIS, CartoDB, ArcGIS, or the like, which may store shapefiles representing wire centers and/or distribution areas of portions of the telecommunication network (e.g., "designated marketing areas"). In one example, one of the servers 136 comprising a database and query system may further include CLLI information regarding different network equipment with various wire centers, central offices, distribution areas, etc. and/or customer demographic information. In one example, servers 136 may also include a field technician dispatch system for receiving work orders/job requests, e.g., for customer premises installation jobs, for tracking assignments of work orders to field technicians and the statuses of different work orders, for interacting with dispatch agent devices (e.g., one of devices 131-134) to allow manual scheduling, assignment of work order, etc., and so on.

Figure 6:
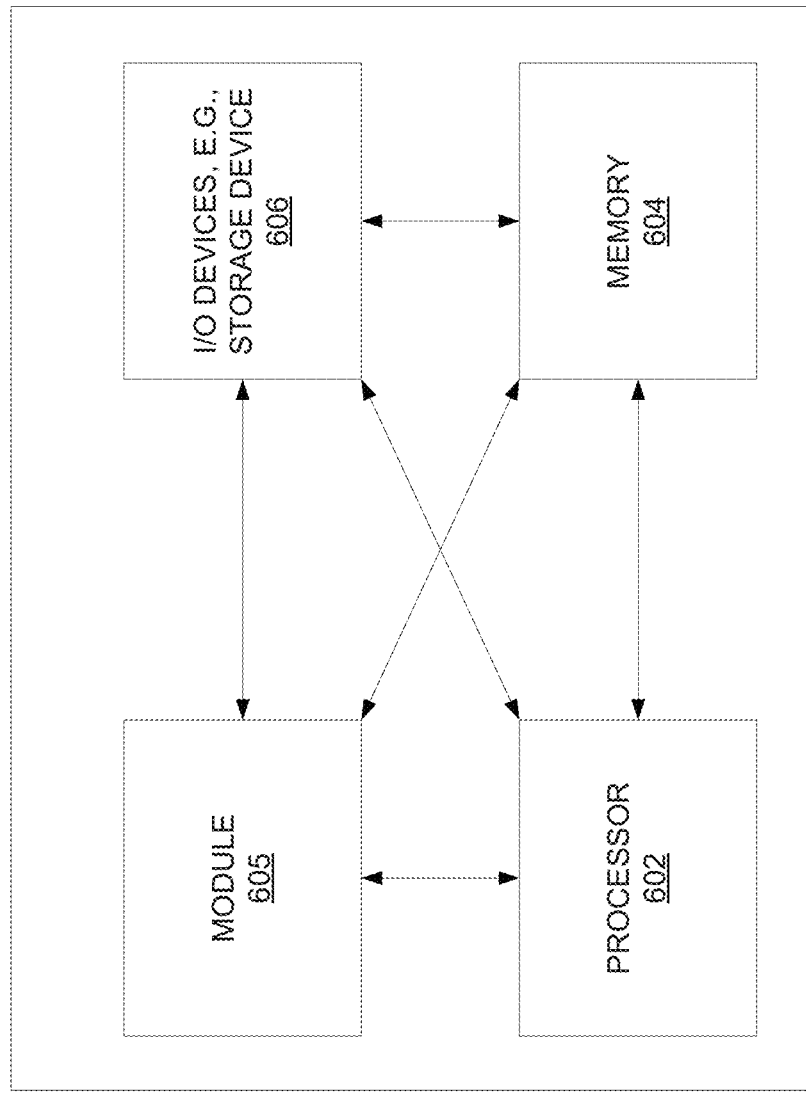
FIG. 6 illustrates a high-level block diagram of a computing device specially programmed to perform the functions described herein.

In one example, organization network 130 may also include an application server (AS) 135. In one example, AS 135 may comprise a computing system, such as computing system 600 depicted in FIG. 6, and may be configured to provide one or more functions for generating a work plan for network technicians of a telecommunication network to include network technician moves among work centers selected in accordance with an objective function, according to the present disclosure. For example, AS 135 may be configured to perform one or more steps, functions, or operations in connection with the example method 500 described below. It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 6 and discussed below) or multiple computing devices collectively configured to perform various steps, functions, and/or operations in accordance with the present disclosure.

In one example, application server 135 may obtain a loan graph among work centers of the telecommunication network 105. The work centers may comprise regions associated with regional offices, e.g., class 3 offices, class 4 and/or class 5 central offices (COs), etc., where the loan graph includes a cost of travel of network technicians between work centers that are adjacent, and where each of the network technicians is assigned to one of the work centers. For instance, FIG. 1 illustrates two work centers 191 and 192 which encompass access networks 110 and 120, respectively. It should be noted that in one example, network technicians (e.g., field technicians) of telecommunication network 105 may be assigned to a home region, or "work center" and may be contractually bound and/or entitled to begin a work day at a dispatch location associated with that work center (e.g., a regional office and/or central office) before traveling to another work center to which the technician may be loaned.

Application server 135 may also obtain a quantity of work in demand for each of the work centers for a day, where at least a first work center has an excess of work in demand for the network technicians assigned to the first work center for the day. For instance, application server 135 may obtain data regarding pending jobs from various servers 136. For instance, one of the servers 136 may comprise a field technician dispatch system maintaining information regarding pending/requested customer installation jobs, technician status and availability, and so forth. In addition, the same or a different one of the servers 136 may also store a loan graph, or may store network topology and other information from which application server 135 may compute the loan graph.

Application server 135 may further select, in accordance with an objective function, a first plurality of moves by at least a first subset of the network technicians, where the first plurality of moves comprises moves to adjacent work centers from work centers to which the first subset of network technicians is assigned, and select, in accordance with the objective function, a second plurality of moves by at least a second subset of the network technicians, where the second plurality of moves comprises moves to adjacent work centers from work centers to which the second subset of network technicians is assigned.

Application server 135 may then generate a work plan for the day for the network technicians in accordance with the first plurality of moves and the second plurality of moves. The work plan may be provided to one of the servers 136 comprising a field technician dispatch system, for example. Alternatively, or in addition, application server 135 may provide the work plan to one or more network technicians, technician dispatch supervisor(s), or other personnel, e.g., via endpoint devices 131-134 and/or via one or more of the endpoint devices 111-113 and 121-123.

These and other example operations for generating a work plan for network technicians of a telecommunication network to include network technician moves among work centers selected in accordance with an objective function are described in greater detail below in connection with the examples of FIGS. 2-6. In addition, it should be realized that the network 100 may be implemented in a different form than that illustrated in FIG. 1, or may be expanded by including additional endpoint devices, access networks, network elements, application servers, etc. without altering the scope of the present disclosure.

In one example, the present disclosure assumes that there are $x_i$ hours of work in demand and $n_i$ number of network technicians assigned to a regional office i. In one example, it may be preferred that $x_i = 8n_i$ for all the regions so that every network technician (or simply "technician") works 8 hours a day. However, due to inconsistent demands, region A may have 10 hours of work per technician, whereas region B may have 2 hours of work per technician on a given day. Thus, more technicians may be assigned to region A and less technicians to region B on this particular day. In one example, regional offices are permitted to loan or borrow network technicians to/from nearby regional offices, with a cost of travel time being added to $x_i$. In one example, a region is not allowed to borrow a technician just to loan the technician back out to another region. Depending on a particular objective that is utilized, a purpose of loaning could be to balance hours of work per technician or to reduce total overtime. In one example, loaning is permitted between certain pairs of regions (and may also be unidirectional) as defined by a directed graph, referred to as a loan graph. In one example, by union contract, a network technician may be required to report to a default location (e.g., the network technician's assigned regional office) first and then travel to whichever region the technician is in need.

Figure 2:
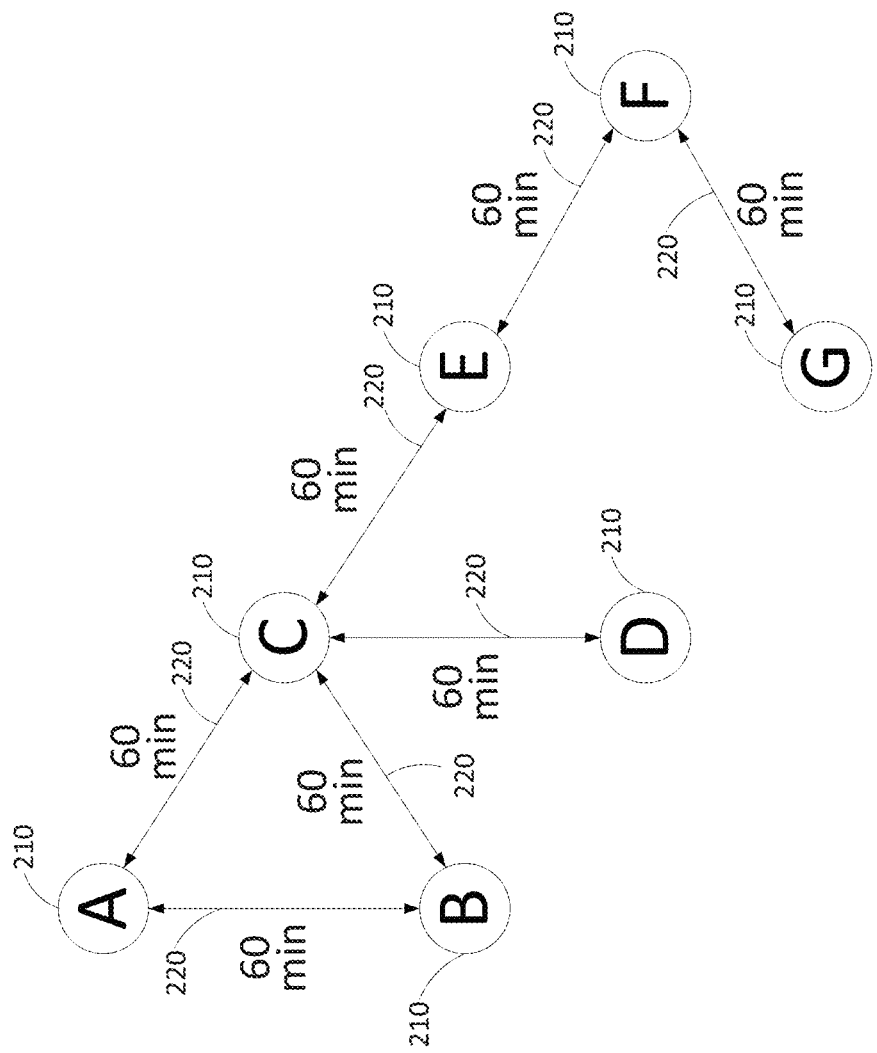
FIG. 2 illustrates an example loan graph for loaning technicians between adjacent regions or work centers, in accordance with the present disclosure.

An example loan graph 200 is illustrated in FIG. 2. As shown in FIG. 2, the loan graph 200 includes a plurality of vertices 210 representing regions or regional offices A-G (also referred to herein as "work centers"). The plurality of vertices 210 is connected via links 220 which are annotated with a cost of travel for a technician to travel from one of the regions A-G to an adjacent region (where adjacent regions are those represented by vertices 210 connected by a single one of the links 220).

A goal of the technician scheduling problem is to select technicians to travel via edges on the loan graph. In one example, in order to balance hours of work per technician, the present disclosure may seek to minimize a first objective function:

$$\sum_i \left( \sum_i x'_i \Big/ \sum_i n'_i - x'_i/n'_i \right), i = 1, 2, \ldots, K, \qquad \text{Equation 1}$$

In Equation 1, $x_i'$ is hours of work with travel time added for incoming technicians, $n_i'$ is a new number of technicians at a region i, and K is a number of regions. In another example, if the objective is to minimize total overtime, the present disclosure may seek to minimize a second objective function:

$$\sum_i OT_i \text{ where } OT_i = \begin{cases} x'_i - 8n'_i & \text{if } x'_i - 8n'_i > 0 \\ 0 & \text{if } x'_i - 8n'_i \le 0 \end{cases} \qquad \text{Equation 2}$$

The present disclosure establishes and solves a multi-agent decision-making problem where each agent (e.g., a technician) is assigned to a default state (e.g., a region) and takes an action as allowed by a loan graph based on local observations (e.g., from the perspective of the individual agent/technician). A reward is calculated as how much a value computed from an objective function has moved towards its ideal value of zero (0) as a consequence of the action. The total reward is the linear sum of these individual rewards computed for actions of individual agents/technicians.

When evaluating a move by each individual technician and incrementally updating a number of technicians traveling via an edge on the loan graph, the headcount-related constraints are guaranteed to be satisfied without specification since the present disclosure is not solving for the number of technicians moving, but for an optimal plan for individual technicians. In accordance with the present disclosure, an agent/technician is allowed to make only one move. If an agent moves from its original state to a new state, the agent is not allowed to take another action available at the new state. In other words, a technician is limited to traveling once a day. On the next day the problem resets and each technician is initially assumed to be reporting to work at the technician's assigned/home region. As such, future rewards are not considered.

The present disclosure deploys a randomized greedy search to solve the technician scheduling problem combinatorial optimization as described herein. The present disclosure performs a series of local searches without constructing an initial solution. As such, the problem is formulated as a multi-agent system to be solved at an agent level, which also allows tracking individual actions and taking into account the different characteristics of the agents/technicians, such as skill sets.

The randomized greedy search of the present disclosure includes sequentially simulating greedy moves performed by randomly selected agents and creating several possible plans of actions. The plan that yields the best result will be selected as a solution to the problem. Assuming $|N|>>M$ and $|N|>>K$, the randomized greedy search of the present disclosure runs in $O(|N|)$ time, where $|N|$, M, and K are a total number of agents, an average number of actions available from a given state, and a number of states, respectively.

FIG. 3 illustrates an example algorithm 300 for generating a daily technician work plan using a randomized greedy search (e.g., for minimizing an objective function via a randomized greedy search), in accordance with the present disclosure. Inputs for the example algorithm 300 are noted in lines 1-6. The vector X for the number of hours of work and the vector N for the number of technicians may be obtained from a network dispatch system or the like which may maintain information regarding pending work orders (e.g., installation jobs, repair jobs, etc.), the status of different network technicians (e.g., working, scheduled vacation, day off, sick, etc.). The loan graph G may be similarly obtained from such a system, or may be created from information gathered regarding different regional offices, the relationships between different regional offices (e.g., which are adjacent), the network technicians assigned to the different regional offices, and so forth. For illustrative purposes, the loan graph G may comprise the loan graph 200 of FIG. 2. The objective function f(X, N), the probability p, and the probability decrease rate d may be set by a network operator (e.g., a dispatch center supervisor responsible for technician work scheduling, or the like). The outputs of the example algorithm 300 are noted in lines 7-8.

A processing system executing instructions, code, and/or a program in accordance with the example algorithm 300 (such as application server 135 of FIG. 1) may first create a random sequence, or "subset" of technicians, e.g., of size $0.1|N|$ (see line 13), and evaluate each technician in the sequence (lines 14-30). The size of the random sequence may be varied in other examples, e.g., between 5 percent and 25 percent of the total number of technicians. A first technician assigned to region i (e.g., region/work center i is the technician's home region) in the random sequence/subset may have a few actions available to take as specified in the loan graph 200. Notably, the number of allowed actions, including staying at an original state, is small because moves are limited to adjacent regions (see line 17 with list of states, A, reachable from original state). For each possible action, the processing system may calculate a value from the objective function (lines 19-22), and whichever action yields the minimum value is selected as an action for the technician (line 23, line 27). Because this greedy action may be a part of a local optimum solution, especially in the earlier stages, the action may be canceled with some probability p (lines 24-25). If the technician does move, in one example an edge is deleted in the reverse direction of the move, if it exists on the loan graph, to prevent cycles (line 26). With the first technician at a new state, the next technician in the random sequence/subset may take a greedy action that would lower the value computed from the objective function (lines 14-30).

In one example, after evaluating and making moves for each technician in the random sequence/subset, the processing system may generate another random sequence of technicians with replacement (line 13). There is a chance that a technician that has already moved in the first sequence is selected again. Unlike Markov decision processes where an agent is evaluated at a new state, the example algorithm 300 resets the agent (technician) to an original state and reevaluates for possible actions from the original state. With a probability smaller than p, the technician either stays in the technician's original state or moves to a new state from the original state. In one example, the probability p decreases by some factor d (line 30) in connection with each new random sequence that is created, in order to decrease randomness in the simulation as the problem approaches convergence. New random sequences are created and technician moves simulated, and selected technicians are allowed to take greedy actions until the value computed from the objective function no longer decreases. The set of moves may then be included in a scheduling plan (with some technicians moving to adjacent regions and other staying in home regions). It should be noted that the example, algorithm 300 may run in linear time. In one example, several possible work plans may be generated and then a best plan for implementation may be selected using an objective function. For instance, a first objective function, such as Equation 1 above, may be used in the course of performing the example algorithm 300 several times, while a second objective function, such as Equation 2 above, may be used to select among several competing plans.

Figure 4:
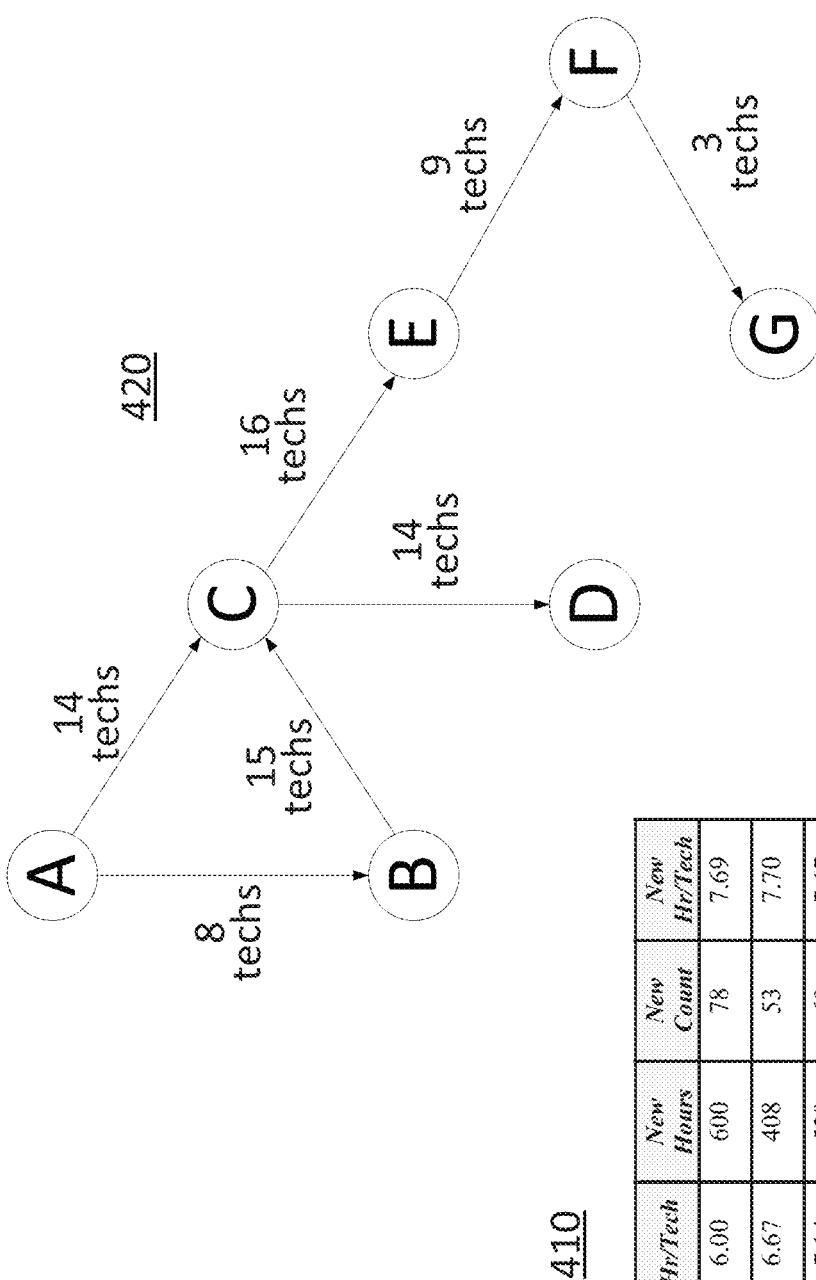
FIG. 4 illustrates a solution to a technician scheduling problem in a table format and in a graph format.

In an illustrative example, the example randomized greedy search algorithm 300 is run for a seven-region technician scheduling problem in accordance with the example loan graph 200 of FIG. 2. For every technician moving into a region i, an hour is added to $x_i$. FIG. 4 illustrates a table 410 comprising a solution to the problem for technicians of regions/work centers A-G with an attempt to balance technician workloads. The first three columns are hours, numbers of technicians, and hours per technician for all the regions before moving any technicians. The last three columns are new hours with travel time added for incoming technicians, new numbers of technicians, and new hours per technician after all the moves are completed. In an example simulation, the value computed from Equation 1 was decreased from 17 to 0.05. As further illustrated in FIG. 4, the graph 420 shows the number of technicians that are traveling via each edge (for instance, the graph 420 may correspond to the loan graph 200 of FIG. 2). These numbers may be derived by tracking actions/moves of individual agents/technicians as indicated by X', N' of the algorithm 300 of FIG. 3.

As mentioned above, the example randomized greedy search algorithm 300 may run in $O(|N|)$ time, where $|N|$ is a total number of technicians. If the number of technicians decreases by some factor, the algorithm 300 may run faster by that same factor. In addition, reducing both hours and headcounts by the same factor yields unchanged hours per technician. Accordingly, after the randomized greedy search is run to solve a technician scheduling problem, if hours and headcounts in each region are both reduced by a decrease factor q, new hours and new headcounts can be multiplied by q to map a new solution to that of the original problem. It should be noted, however, that the numbers of technicians moving via edges on the loan graph will be multiples of q.

Conversely, in one example, greater computational efficiency may be gained by running the algorithm with respect to scaled down numbers of technicians and work hours, and the solution scaled back up to match the actual numbers of technicians. For instance, if the total number of technicians is 400, the algorithm 300 may be run with regard to 200 technicians (half). Then the number of technicians travelling between adjacent regions according to the solution may be multiplied by an inverse scaling factor (e.g., doubled) to match the actual total number of technicians. For example, if the scaled-down solution indicates that 7 technicians are loaned from region A to region B, then 14 technicians should actually be loaned from region A to region B. In one example, the present disclosure may choose to run a randomized greedy search algorithm at a scale that balances run time and accuracy as selected by a network operator (e.g., by a technician dispatch supervisor).

In the foregoing, it is assumed every technician is qualified to perform the type(s) of work in demand. However, in another example, there may be two (or more) different job types: e.g., type A and type B that require two different skill sets. In addition, in one example there may also be two groups of technicians: one group that can perform type A jobs and another group that can perform both type A and type B jobs. In such an example, the present disclosure may still move technicians in order to balance hours of work per technician. However, less technicians may be capable of performing type B jobs. To address this scenario, in one example, the present disclosure may perform two runs of a randomized greedy search. For instance, $X_B$ may comprise a vector of hours of type B jobs and $N_B$ may comprise a vector of a number of technicians that can perform type B jobs, respectively. The new goal of the problem is then to balance a workload with an extra constraint that no overtime occurs for type B jobs. To illustrate, the randomized greedy search (e.g., according to the example algorithm 300) may first be run on $X_B$ and $N_B$ with an objective to minimize overtime. For instance, Equation 2 may be used as the cost function/objective function to minimize. The first randomized greedy search may be completed in $O(|N_B|)$ time. For each region, a minimum number of technicians required to complete type B jobs and a list of these technicians may be recorded.

Next, X may represent a vector of total hours of work (for both type A and type B) and N may represent a vector of the total numbers of technicians, respectively. It should be noted that in one example, X and N are recomputed using the result from the previous run of the randomized greedy search. Then, the randomized greedy search (e.g., according to the example algorithm 300) may be run again on X and N with an objective to balance the workload among technicians, and with an extra restriction that random sequences of technicians do not include the ones that are in the list created earlier. These technicians are designated stay in order to complete type B jobs. The remaining work hours after completing type B jobs will be allocated to complete type A jobs. It should be noted that X and N are for both type A and type B jobs, not only type A jobs.

It takes $O(|N|-|N_B|)$ times to run the second randomized greedy search because the technicians that are already evaluated in the first run are not reevaluated. Therefore, the total run time of the algorithm remains unchanged at $O(|N|)$ even with multiple runs of the algorithms. If there are more than two types of jobs, the jobs may be arranged in an order of scarcity (technician scarcity) and the algorithm run multiple times in that order. This may minimize overtime of the scarce jobs and then balance total hours of work by moving the technicians with more limited skill sets.

Figure 5:
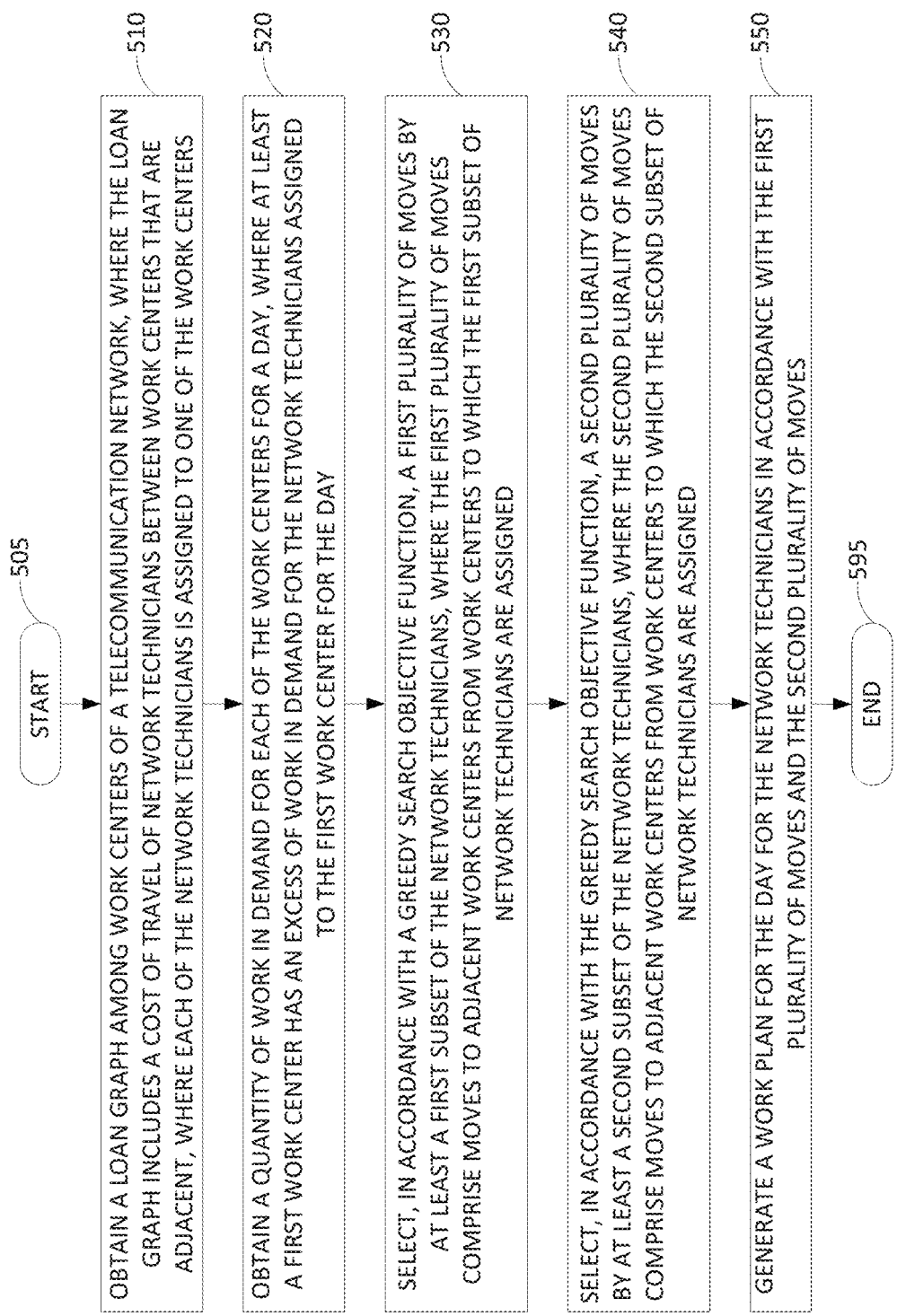
FIG. 5 illustrates a flowchart of an example method for generating a work plan for network technicians of a telecommunication network to include network technician moves among work centers selected in accordance with an objective function.

FIG. 5 illustrates a flowchart of an example method 500 for generating a work plan for network technicians of a telecommunication network to include network technician moves among work centers selected in accordance with an objective function. In one example, the method 500 is performed by a component of the system 100 of FIG. 1, such as by application server 135, and/or any one or more components thereof (e.g., a processor, or processors, performing operations stored in and loaded from a memory), or by application server 135, in conjunction with one or more other devices, such as servers 136, and so forth. In one example, the steps, functions, or operations of method 500 may be performed by a computing device or system 600, and/or processor 602 as described in connection with FIG. 6 below. For instance, the computing device or system 600 may represent any one or more components of application server 135, server 136, etc. in FIG. 1 that is/are configured to perform the steps, functions and/or operations of the method 500. Similarly, in one example, the steps, functions, or operations of method 500 may be performed by a processing system comprising one or more computing devices collectively configured to perform various steps, functions, and/or operations of the method 500. For instance, multiple instances of the computing device or processing system 600 may collectively function as a processing system. For illustrative purposes, the method 500 is described in greater detail below in connection with an example performed by a processing system. The method 500 begins at step 505 and proceeds to step 510.

At step 510, the processing system obtains a loan graph among work centers of a telecommunication network, where the loan graph includes a cost of travel of network technicians between work centers that are adjacent, and where each of the network technicians is assigned to one of the work centers. In one example, step 510 may comprise generating the loan graph, e.g., from a network topology database, from a database of network technicians and the network technicians' work center assignments (e.g., home regions), and so forth.

At step 520, the processing system obtains a quantity of work in demand for each of the work centers for a day, where at least a first work center has an excess of work in demand for the network technicians assigned to the first work center for the day. For instance, the quantity of work in demand may be obtained from the same or similar sources as noted at step 510.

At step 530, the processing system selects, in accordance with an objective function, a first plurality of moves by at least a first subset of the network technicians, where the first plurality of moves comprises moves to adjacent work centers from work centers to which the first subset of network technicians is assigned. In one example, the first plurality of moves is selected from among possible moves for network technicians in the first subset between adjacent work centers in accordance with the loan graph. In one example, step 530 may include selecting the first subset of network technicians at random from among the network technicians. In one example, the first subset of network technicians is selected to include a percentage of the total number of network technicians. For instance, the percentage may comprise between 5 percent and 25 percent (e.g., 10 percent).

In one example, the objective function identifies a reward for balancing a quantity of work among the network technicians for the day. In another example, the objective function identifies a reward for reducing overtime of network technicians of the sets of network technicians assigned to plurality of work centers in excess of a designated quantity of work for the day. For instance, the work may be quantified by time, and the overtime may be work by an individual network technician in excess of eight hours (or in excess of seven hours, six hours, etc.) on a given day.

In one example, the objective function may comprise either of Equation 1 or Equation 2 set forth above. In addition, step 530 may comprise minimizing the objective function in accordance with the first plurality of moves. In one example, the objective function may be qualified by at least one constraint, such as each work center being prevented from loaning more network technicians to adjacent work centers than the number of network technicians assigned to the work center, or preventing the total number of the network technicians from being changed.

In one example, step 530 may include selecting a first network technician from the first subset of network technicians, calculating, in accordance with the objective function, respective reward values for a plurality of potential moves for the first network technician (e.g., in accordance with the loan graph), and selecting one of the plurality of potential moves for the first network technician as a move for the first network technician. For instance, the first move may comprise a move of the first network technician to a work center that is adjacent to a work center to which the first network technician is assigned. In addition, the first move for the first network technician may be included as one of the first plurality of moves for the network technicians in the first subset.

In one example, step 530 may further include selecting a second network technician from the first subset of network technicians, calculating, in accordance with the objective function, respective reward values for a plurality of potential moves for the second network technician (e.g., in accordance with the loan graph), and selecting one of the plurality of potential moves for the second network technician as a move for the second network technician. For instance, the second move may comprise a move of the second network technician to a work center that is adjacent to a work center to which the second network technician is assigned. In addition, the second move for the second network technician may be included as one of the first plurality of moves for the network technicians in the first subset.

In one example, step 530 may also include determining whether to cancel each of the first plurality of moves in accordance with a cancellation probability, and canceling moves of the first plurality of moves that are determined to be canceled in accordance with the cancellation probability. For instance step 530 may include operations which are the same as or similar to that which is described above in connection with the example algorithm 300 (e.g., lines 24-25).

It should also be noted that although the terms, "first," "second," "third," etc., are used herein, the use of these terms are intended as labels only. Thus, the use of a term such as "third" in one example does not necessarily imply that the example must in every case include a "first" and/or a "second" of a similar item. In other words, the use of the terms "first," "second," "third," and "fourth," do not imply a particular number of those items corresponding to those numerical values. In addition, the use of the term "third" for example, does not imply a specific sequence or temporal relationship with respect to a "first" and/or a "second" of a particular type of item, unless otherwise indicated.

At step 540, the processing system selects, in accordance with the objective function, a second plurality of moves by at least a second subset of the network technicians, where the second plurality of moves comprises moves to adjacent work centers from work centers to which the second subset of network technicians is assigned. In one example, the second plurality of moves is selected from among possible moves for network technicians in the second subset between adjacent work centers in accordance with the loan graph. For instance, step 540 may comprise the same or similar operations as step 530, however with respect to a different subset of network technicians. In addition, step 540 may comprise minimizing the objective function in accordance with the second plurality of moves.

In one example, step 540 may include selecting the second subset of network technicians at random from among the network technicians. In one example, the second subset of network comprises a percentage of the total number of network technicians (e.g., the same percentage that may be implemented with respect to the first subset at step 530). In addition, in one example, the selection may be "with replacement." In other words, a network technician selected to be in the first subset at step 530 may still be selected to be in the second subset at step 540. In this case, step 540 may include calculating, in accordance with the objective function, respective reward values for a second plurality of potential moves for the first network technician, and selecting one of the second plurality of potential moves for the first network technician as the move for the first network technician. Such a move may also be included in the second plurality of moves. It should be noted that the second plurality of potential moves may be evaluated from the home work center/assigned work center of the first network technician, not from any adjacent work center to which the first network technician may be scheduled to travel in accordance with a selection at step 530.

In one example, step 540 may include lowering the cancellation probability in accordance with a reduction factor, determining whether to cancel each of the second plurality of moves in accordance with the cancellation probability, and canceling moves of the second plurality of moves that are determined to be canceled in accordance with the cancellation probability. For instance, step 540 may include operations which are the same as or similar to that which is described above in connection with the example algorithm 300 (e.g., lines 24-25 (probabilistic random cancellation) and line 30 (lowering of the probability by a reduction factor)).

With regard to both steps 530 and 540, it should be noted that some network technicians stay put if a move does not increase the reward. However, since at least one of the work centers includes an excess of work in demand, at least one network technician may be selected to make a move in accordance with the method 500. In addition, with regard to both steps 530 and 540 it should also be noted that at least two iterations of a greedy search are performed. In other words, at least two subsets of network technicians are evaluated for making moves. However, at least the first subset may comprise more than one subset, and at least the second subset may also comprise more than one subset such that multiple iterations of the greedy search are performed. In one example, the number of iterations is such that subsequent subsets of network technicians are evaluated for additional moves until convergence, that is, until there are no more improvements (and/or negligible improvement) in minimizing the objective function.

At step 550, the processing system generates a work plan for the day for the network technicians in accordance with the first plurality of moves and the second plurality of moves. For instance, the work plan may include at least the first move of the first network technician and/or the second move of the second network technician in the first subset, moves of network technicians in the second subset, and so forth.

Following step 550, the method 500 proceeds to step 595 where the method ends.

It should be noted that the method 500 may be expanded to include additional steps, or may be modified to replace steps with different steps, to combine steps, to omit steps, to perform steps in a different order, and so forth. For instance, in one example the processing system may repeat one or more steps of the method 500, such as steps 530-540 with respect to additional subsets, steps 510-550 with regard to a different day, or to generate several possible work plans for a day from which one may be selected, and so forth. In another example, the method 500 may further account for specific skills anticipated to be required, such as performing an initial iteration with regard to the work demands associated with the most scare technician skills, and then performing a subsequent iteration with regard to work demands that may be fulfilled by a larger population of network technicians, and so on. For instance, the telecommunication network operator may maintain pools of network-based technicians with different sets of skills (e.g., overhead distribution versus buried fiber to the premises (FTTP), network-side installation work versus customer premises-based installation work, and so on). Thus, these and other modifications are all contemplated within the scope of the present disclosure.

In addition, although not expressly specified above, one or more steps of the method 500 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 5 that recite a determining operation or involve a decision do not necessarily require that both branches of the determining operation be practiced. In other words, one of the branches of the determining operation can be deemed as an optional step. However, the use of the term "optional step" is intended to only reflect different variations of a particular illustrative embodiment and is not intended to indicate that steps not labelled as optional steps to be deemed to be essential steps. Furthermore, operations, steps or blocks of the above described method(s) can be combined, separated, and/or performed in a different order from that described above, without departing from the example embodiments of the present disclosure.

FIG. 6 depicts a high-level block diagram of a computing device or processing system specifically programmed to perform the functions described herein. For example, any one or more components or devices illustrated in FIG. 1 or described in connection with the method 500 may be implemented as the processing system 600. As depicted in FIG. 6, the processing system 600 comprises one or more hardware processor elements 602 (e.g., a microprocessor, a central processing unit (CPU) and the like), a memory 604, (e.g., random access memory (RAM), read only memory (ROM), a disk drive, an optical drive, a magnetic drive, and/or a Universal Serial Bus (USB) drive), a module 605 for generating a work plan for network technicians of a telecommunication network to include network technician moves among work centers selected in accordance with an objective function, and various input/output devices 606, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one processor element is shown, it should be noted that the computing device may employ a plurality of processor elements. Furthermore, although only one computing device is shown in the Figure, if the method(s) as discussed above is implemented in a distributed or parallel manner for a particular illustrative example, i.e., the steps of the above method(s) or the entire method(s) are implemented across multiple or parallel computing devices, e.g., a processing system, then the computing device of this Figure is intended to represent each of those multiple computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 602 can also be configured or programmed to cause other devices to perform one or more operations as discussed above. In other words, the hardware processor 602 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer readable instructions pertaining to the method(s) discussed above can be used to configure a hardware processor to perform the steps, functions and/or operations of the above disclosed method(s). In one example, instructions and data for the present module or process 605 for generating a work plan for network technicians of a telecommunication network to include network technician moves among work centers selected in accordance with an objective function (e.g., a software program comprising computer-executable instructions) can be loaded into memory 604 and executed by hardware processor element 602 to implement the steps, functions or operations as discussed above in connection with the example method 500. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 605 for generating a work plan for network technicians of a telecommunication network to include network technician moves among work centers selected in accordance with an objective function (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described example embodiments, but should be defined only in accordance with the following claims and their equivalents.

What is claimed is:

1. A method comprising:
    obtaining, by a processor, a loan graph among work centers of a telecommunication network, wherein the loan graph includes a cost of travel of network technicians between work centers that are adjacent, wherein each of the network technicians is assigned to one of the work centers;
    obtaining, by the processor, a quantity of work in demand for each of the work centers for a day, wherein at least a first work center of the work centers has an excess of work in demand for the network technicians assigned to the first work center for the day;
    selecting, by the processor in accordance with an objective function, a first plurality of moves by at least a first subset of the network technicians, wherein the first plurality of moves comprises moves to adjacent work centers from work centers to which network technicians of the first subset of network technicians are assigned;
    selecting, by the processor in accordance with the objective function, a second plurality of moves by at least a second subset of the network technicians, wherein the second plurality of moves comprises moves to adjacent work centers from work centers to which network technicians of the second subset of network technicians are assigned, wherein the first plurality of moves and the second plurality of moves are selected from among possible moves between adjacent work centers in accordance with the loan graph, wherein the objective function identifies a reward for balancing a quantity of work among the network technicians for the day or identifies a reward for reducing an overtime of the network technicians of the first and second subsets of network technicians assigned to a plurality of work centers in excess of a designated quantity of work for the day, wherein the selecting the first plurality of moves comprises minimizing the objective function in accordance with the first plurality of moves, and wherein the selecting the second plurality of moves comprises minimizing the objective function in accordance with the second plurality of moves; and
    generating, by the processor, a work plan for the day for the network technicians in accordance with the first plurality of moves and the second plurality of moves.

2. The method of claim 1, wherein the first subset of network technicians is selected at random from among the network technicians, and wherein the second subset of network technicians is selected at random from among the network technicians.

3. The method of claim 2, wherein each of the at least the first subset of network technicians and the at least the second subset of network technicians comprises a percentage of a total number of the network technicians.

4. The method of claim 3, wherein the percentage comprises between 5 percent and 25 percent.

5. The method of claim 1, wherein the selecting the first plurality of moves comprises:
    selecting a first network technician from the first subset of network technicians;
    calculating, in accordance with the objective function, respective reward values for a plurality of potential moves for the first network technician; and
    selecting one of the plurality of potential moves for the first network technician as a first move for the first network technician, wherein the first move for the first network technician comprises one of the first plurality of moves.

6. The method of claim 5, wherein the first move comprises a move of the first network technician to a work center that is adjacent to a work center to which the first network technician is assigned, and wherein the work plan includes the first move.

7. The method of claim 5, wherein when the first network technician is selected to be in the first subset of network technicians, and is also selected to be in the second subset of network technicians, the selecting the second plurality of moves by at least the second subset of the network technicians comprises:
    canceling the first move for the first network technician;
    calculating, in accordance with the objective function, respective reward values for a second plurality of potential moves for the first network technician; and
    selecting one of the second plurality of potential moves for the first network technician as a second move for the first network technician, wherein the second move for the first network technician comprises one of the second plurality of moves.

8. The method of claim 5, wherein the selecting the first plurality of moves further comprises:
    selecting a second network technician from the first subset of network technicians;
    calculating, in accordance with the objective function, respective reward values for a plurality of potential moves for the second network technician; and
    selecting one of the plurality of potential moves for the second network technician as a second move for the second network technician, wherein the second move for the second network technician comprises one of the first plurality of moves.

9. The method of claim 8, wherein the second move comprises a move of the second network technician to a work center that is adjacent to a work center to which the second network technician is assigned, and wherein the work plan includes the second move.

10. The method of claim 1, wherein the selecting the first plurality of moves comprises:
   determining whether to cancel each of the first plurality of moves in accordance with a cancellation probability; and
   canceling moves of the first plurality of moves that are determined to be canceled in accordance with the cancellation probability.

11. The method of claim 10, wherein the selecting the second plurality of moves comprises:
   lowering the cancellation probability in accordance with a reduction factor;
   determining whether to cancel each of the second plurality of moves in accordance with the cancellation probability; and
   canceling moves of the second plurality of moves that are determined to be canceled in accordance with the cancellation probability.

12. The method of claim 1, wherein the objective function comprises $\Sigma_i(\Sigma_i x_i'/\Sigma_i n_i' - x_i'/n_i')^2, \ldots, K$, and wherein $x_i'$ is hours of work with a travel time added for network technicians traveling to an adjacent work center, $n_i'$ is a new number of network technicians at a work center i after a move by a network technician, and K is a number of work centers.

13. The method of claim 1, wherein the objective function comprises $\Sigma_i OT_i$ wherein $T_i$ equals $x_i' - n_i'$ if $x_i' - n_i' > 0$ and wherein $OT_i$ equals zero if $x_i' - n_i' \leq 0$, and wherein $x_i'$ is hours of work with a travel time added for network technicians traveling to an adjacent work center, $n_i'$ is a new number of network technicians at a work center i after a move by a network technician.

14. The method of claim 1, wherein the objective function is qualified by at least one constraint, wherein the at least one constraint comprises:
   each work center cannot loan more network technicians to adjacent work centers than the number of network technicians assigned to the work center; or
   a total number of the network technicians does not change.

15. A non-transitory computer-readable medium storing instructions which, when executed by a processing system including at least one processor, cause the processing system to perform operations, the operations comprising:
   obtaining a loan graph among work centers of a telecommunication network, wherein the loan graph includes a cost of travel of network technicians between work centers that are adjacent, wherein each of the network technicians is assigned to one of the work centers;
   obtaining a quantity of work in demand for each of the work centers for a day, wherein at least a first work center of the work centers has an excess of work in demand for the network technicians assigned to the first work center for the day;
   selecting, in accordance with an objective function, a first plurality of moves by at least a first subset of the network technicians, wherein the first plurality of moves comprises moves to adjacent work centers from work centers to which network technicians of the first subset of network technicians are assigned;
   selecting, in accordance with the objective function, a second plurality of moves by at least a second subset of the network technicians, wherein the second plurality of moves comprises moves to adjacent work centers from work centers to which network technicians of the second subset of network technicians are assigned, wherein the first plurality of moves and the second plurality of moves are selected from among possible moves between adjacent work centers in accordance with the loan graph, wherein the objective function identifies a reward for balancing a quantity of work among the network technicians for the day or identifies a reward for reducing an overtime of the network technicians of the first and second subsets of network technicians assigned to a plurality of work centers in excess of a designated quantity of work for the day, wherein the selecting the first plurality of moves comprises minimizing the objective function in accordance with the first plurality of moves, and wherein the selecting the second plurality of moves comprises minimizing the objective function in accordance with the second plurality of moves; and
   generating a work plan for the day for the network technicians in accordance with the first plurality of moves and the second plurality of moves.

16. A device comprising:
a processor system including at least one processor; and
a computer-readable medium storing instructions which, when executed by the processing system, cause the processing system to perform operations, the operations comprising:
   obtaining a loan graph among work centers of a telecommunication network, wherein the loan graph includes a cost of travel of network technicians between work centers that are adjacent, wherein each of the network technicians is assigned to one of the work centers;
   obtaining a quantity of work in demand for each of the work centers for a day, wherein at least a first work center of the work centers has an excess of work in demand for the network technicians assigned to the first work center for the day;
   selecting, in accordance with an objective function, a first plurality of moves by at least a first subset of the network technicians, wherein the first plurality of moves comprises moves to adjacent work centers from work centers to which network technicians of the first subset of network technicians are assigned;
   selecting, in accordance with the objective function, a second plurality of moves by at least a second subset of the network technicians, wherein the second plurality of moves comprises moves to adjacent work centers from work centers to which network technicians of the second subset of network technicians are assigned, wherein the first plurality of moves and the second plurality of moves are selected from among possible moves between adjacent work centers in accordance with the loan graph, wherein the objective function identifies a reward for balancing a quantity of work among the network technicians for the day or identifies a reward for reducing an overtime of the network technicians of the first and second subsets of network technicians assigned to a plurality of work centers in excess of a designated quantity of work for the day, wherein the selecting the first plurality of moves comprises minimizing the objective function in accordance with the first plurality of moves, and wherein the selecting the second plurality of moves comprises minimizing the objective function in accordance with the second plurality of moves; and generating a work plan for the day for the network technicians in accordance with the first plurality of moves and the second plurality of moves.

17. The device of claim 16, wherein the first subset of network technicians is selected at random from among the network technicians, and wherein the second subset of network technicians is selected at random from among the network technicians.

18. The device of claim 17, wherein each of the at least the first subset of network technicians and the at least the second subset of network technicians comprises a percentage of a total number of the network technicians.

19. The device of claim 18, wherein the percentage comprises between 5 percent and 25 percent.

20. The device of claim 16, wherein the selecting the first plurality of moves comprises:
  selecting a first network technician from the first subset of network technicians;
  calculating, in accordance with the objective function, respective reward values for a plurality of potential moves for the first network technician; and
  selecting one of the plurality of potential moves for the first network technician as a first move for the first network technician, wherein the first move for the first network technician comprises one of the first plurality of moves.

* * * * *